Figure 1:
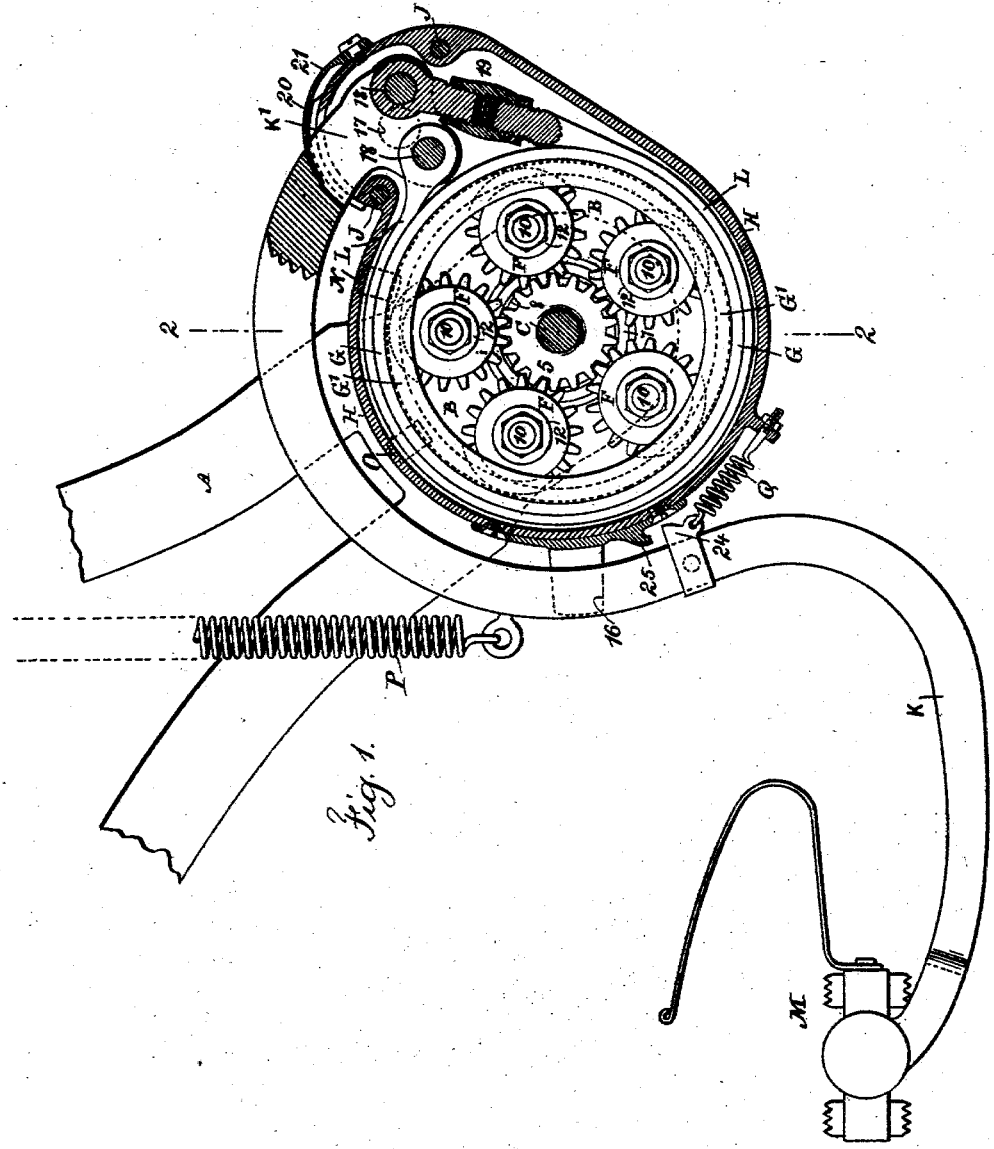

No. 629,177. Patented July 18, 1899.
A. P. STEPHENS.
CYCLE DRIVING MECHANISM.
(Application filed Dec. 27, 1897.)
(No Model.) 2 Sheets—Sheet 1.

Witnesses
Chas H. Smith
J. Staib

Inventor
Anson P. Stephens
per L. W. Serrell & Son
Attys

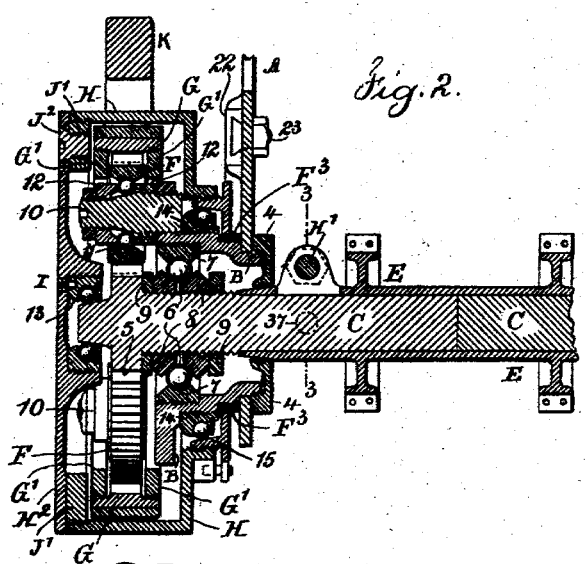

UNITED STATES PATENT OFFICE.

ANSON P. STEPHENS, OF NEW YORK, N. Y.

CYCLE DRIVING MECHANISM.

SPECIFICATION forming part of Letters Patent No. 629,177, dated July 18, 1899.

Application filed December 27, 1897. Serial No. 663,485. (No model.)

*To all whom it may concern:*

Be it known that I, ANSON P. STEPHENS, a citizen of the United States, residing in the city, county, and State of New York, have invented an Improvement in Cycle Driving Mechanism, of which the following is a specification.

This improvement relates to the driving mechanism applied to the front wheel of the cycle, it being preferable with this improvement to mount the front wheel in a rigid frame-fork and to mount the rear wheel in a fork and steering-head, so that the cycle can be guided by the rear wheel; but the driving mechanism is not necessarily limited to a cycle of this character, as the same might be applied to a front wheel in a steering-fork or the shaft of a cycle.

In this improvement the axle and hub of the front wheel are rigidly connected and pinions are provided upon the axle. The frame-fork is provided with a rigid axle-box surrounding the ball-bearing of the axle and having a flange that supports studs receiving intermediate pinions gearing to the axle-pinion, and around this range of pinions is an internal gear-ring and a surrounding clamp-strap connected at its ends to a foot-lever pivoted upon a case surrounding the gear-ring and pinions, so that when the foot-lever is depressed the clamp-strap holds the internal gear-ring and gives the same a partial revolution, turning the driving-wheel through the axle, pinion, and intermediate gears, and the foot-lever is raised and releases the clamp-strap, so that the parts may continue to move with the driving-wheel, as the motion may be maintained by the depression of the foot-lever at the other side of the wheel, these movements being repeated alternately.

In the drawings, Figure 1 is a sectional elevation representing the case, the internal gear, the clamp-strap, and the foot-lever. Fig. 2 is a vertical section at the line 2 2 of Fig. 1. Fig. 3 is a cross-section at the line 3 3 of Fig. 2. Fig. 4 is a partial plan view showing the driving mechanism at one side of the wheel, and Fig. 5 is an elevation of a portion of the frame.

The frame-fork is adapted to receive between the fork the hub E of the driving-wheel, and this frame-fork may be of any desired character, either rigid with the main frame or adapted to be turned in steering. A portion of this frame is shown at A, and at the lower end of the fork, at each side, is an axle-box B, this axle-box being tubular to pass through an eye at the lower end of the frame-fork, in which position it is firmly secured by a nut 4, which is advantageously provided with a dust-guard and felt-ring $F^3$, setting closely around the tubular axle of the wheel.

The hub E is of any desired character and provided with flanges or other devices for the spokes of the wheel, and such hub has a tubular center to receive the axle C, which axle is preferably made in two parts, so as to be inserted from the ends into the hub, and the tube of the hub is split, as shown in the cross-section, Fig. 3, and receives through ears the clamp-bolt H', by which the axle is firmly clamped within the tubular hub, and a set-screw 37 is preferably provided, as shown in Fig. 3, passing into a groove or hole in the axle, whereby the axle and hub are firmly connected and rotate together. It is also advantageous to flatten the axle at one side, as shown, so as to lessen the risk of the axle turning or becoming loose in the hub.

Upon the shaft of the cycle or upon the end of the axle is a pinion 5, and such axle is screw-threaded behind the pinion to receive the bearing-rings 8 and lock-nuts 9, and the balls 6 are between these bearing-rings 8 and the grooved bearing-ring 7, that is screwed within the stationary axle-box B. By this means the axle and wheel are reliably supported within the stationary axle-box, and the parts can be adjusted to allow for wear by screwing one or both rings 8 toward the other and preventing them turning by setting up the lock-nuts.

The stationary axle-box B is made with a front flange, receiving through it the studs 10, supporting the intermediate pinions F, and the internal gear-ring G surrounds the intermediate pinions F, the teeth of the pinions and ring interlocking, and it is advantageous to support the intermediate pinions F by ball-bearings, the opening in each pinion being grooved for the balls 11, and the collars 12 being upon the studs 10 at opposite sides of the balls, and the studs 10 are conical or tapering, so that by adjusting the collars 12 wear may be compensated, and lock-nuts are provided at the ends of the studs, and the studs 10 being screwed into the flange can be screwed out and locked by the nuts as the parts may wear.

In order to hold the internal gear-ring in position around the intermediate pinions F, it is advantageous to provide such internal gear-ring with guide-flanges G', projecting inward and coming at opposite sides of the intermediate pinions. I have represented the ring G as screw-threaded internally at each side of the teeth of such internal gear, so that the guide rings or flanges G' are screwed into the ring G, which is convenient for allowing the teeth of the internal gear-ring to be properly cut; but one or both of these guide-flanges G' may be made integral with the internal gear-ring.

The case H surrounds the axle-box, the gearing, and the internal gear-ring, and this case has a removable cap $H^2$, and this case receives a turning motion backward and forward around the stationary axle-box, and in order to support this case in position and lessen friction ball-bearings are advantageously employed, the outer ball-bearings 13 intervening between the cap $H^2$ and the conical end of the axle C and the inner ball-bearings 14 intervening between the axle-box B and the inner opening of the case, and it is advantageous to construct these ball-bearings so that they may be adjusted. The outer ball-bearing is represented with a screw-ring within an annular flange upon the inside of the cap $H^2$, and this screw-ring can be adjusted to compensate wear and held in position by a screw or pin I, and the inner ball-bearing 14 is provided with a screw-ring passing into the opening in the case H, the surface of which ring is conical to press upon the balls of the ring, and this ring has a flange extending nearly to the exterior cylindrical surface of the axle-box B, as represented at 15, and a ring of felt or similar material $F^3$ may surround the stationary axle-box and fit the interior of the ring-flange 15 for excluding dust, and there should be a movable screw or pin passing through the flange 15 into the axle-box to prevent the ring-flange unscrewing.

The case H is made with an opening in the upper and forward part, receiving into it the forked end K' of the foot-lever K, and the pivot-pins 17, projecting from the foot-lever, pass into or through holes in the case H and cap $H^2$, respectively, and this foot-lever can be inserted or withdrawn from the case when the screws J, that hold the cap $H^2$, have been removed. The cover of the case may be secured in any desired manner. I have represented a ring J', that is screwed within the case and receives into it the screws $J^2$, which are additional to the screws J near the pivot of the lever.

There is a space between the cylindrical portion of the case H and the internal gear-ring G, into which is received the clamping-strap L, the ends of the clamping-strap terminating as eyes within the fork K' of the foot-lever, and the cross-pins 18 pass through the eyes of the clamping-strap and through the fork K' of the foot-lever, and it is advantageous to provide an adjusting-coupling 19 internally screw-threaded with right and left hand threads for connecting one end of the clamping-strap with its eye and by the coupling adjusting the length of the strap accurately, so that it will grasp the internal gear when the foot-lever K is moved downward and will release such internal gear when the foot-lever is being moved upward, the cross-pins 18 being so located in relation to the fork K' of the foot-lever that the swing of the foot-lever upon its pivots in one direction engages the clamp-strap to the internal gear and disengages the same by the swing in the other direction.

It is advantageous to provide dust-guards at 20 to close the opening in the case through which the fork of the foot-lever passes. These dust-caps may be of any desired character. I have represented the guard 20 as segmental plates connected with the lever-fork and overlapping the segmental surfaces of the case H and the guard 21 as fastened upon the case and passing between the fork of the foot-lever. I also provide a forked guide 16 upon the case H, between which the foot-lever K is received and in which forked guide the lever swings and the guide prevents undue strain upon the pivots of the lever by any lateral pressure from the foot, and upon the outer end of the foot-lever a suitable treadle M is provided and preferably having a toe-clamp, so that the pedal can be lifted by the toe-clamp as the foot is raised, and the reverse or downward movement of the pedal and foot-lever gives motion to the driving-wheel in consequence of tightening the clamp-strap L and causing the same to turn the internal gear G as the lever, case, clamp-strap, and internal gear are turned together and partially revolve around the fixed axle-box, and during this movement the teeth of the internal gear, turning the intermediate pinions F, give a motion to the axle-pinion 5 and axle C, which is accelerated in proportion to the size of the axle-pinion, because in this movement the studs 10 of the intermediate pinions remaining stationary the axle-pinion 5 will recieve a motion corresponding to the number of teeth in the internal gear G that are moved forward each action of the foot-lever.

The before-described parts are easily constructed and can be put together or taken apart with convenience, and there is but little friction, and the stroke or rise-and-fall motion of the foot-lever can be regulated according to the convenience of the rider, and when desired a spring P may be provided between the foot-lever and the frame-fork for raising the foot-lever and giving the return motion to the case; but where a toe-clamp is provided for the pedal this spring may be dispensed with. It is also advantageous to provide a spring Q between the case H and a clip upon the foot-lever K, so as to insure the proper turning movement of the case as the foot-lever rises.

It is advantageous to limit the turning movement given by the foot-lever to the case and the parts within the same, and with this object in view a stop N is provided on the case H, projecting rearward, and upon the framework A a stop O is provided, against which a stop N is arrested, and this stop O is advantageously mounted upon a plate 22, slotted near its ends and receiving the bolts 23, that pass through the framework A for holding the stop O in position and for allowing such stop to be adjusted in one direction or the other to lengthen or shorten the stroke of the foot-lever and the parts moving with the same.

It will now be understood that when the foot-levers are relieved from pressure the internal gear-ring G is free to turn along with the pinions as the driving-wheel may revolve in coasting or otherwise, because the direction of rotation of the ring G will tend to loosen the clamp-strap L, and when the foot-levers are held by the feet and more or less pressure applied to them the clamp-strap L acts as a brake upon the internal gear-ring and through the gearing upon the driving-wheel, so that the speed of the cycle can be regulated at will, it being of course borne in mind that too much pressure should not be quickly applied to the foot-levers, tending to stop the cycle too suddenly.

In instances where a speed-gearing has been applied to the front wheel for driving the same and cranks are made use of it has been necessary for the rider to sit sufficiently forward to keep the feet upon the cranks when they are in front of the crank-shaft, and this throws the principal weight upon the front wheel, causing the tire to wear faster than the rear wheel, but by the present improvement the foot-levers extending to the rear of the front axle and simply moving up and down enables the rider to be seated farther back upon the cycle, so that the wear comes more uniformly on the two tires, and in addition there is less liability of being thrown over the handle-bar in case of meeting an obstruction.

In the present improvement a perpendicular plane passing through the foot-lever also passes through the gearing, so that the moving parts are in substantially one plane and the pressure exerted by the foot does not tend to bind any of the parts, and the feet can be much nearer together than in cases where the pedal is outside of the crank-arm, and the feet can move comparatively near the sides of the front wheel without risk of coming into contact with the same, as is the case where foot-levers have been employed for driving the rear wheel, in which case the rider has to be sufficiently behind the front wheel to allow the front wheel to be turned in steering the cycle.

I do not limit myself to any particular connection for giving motion to the internal gear-ring by the downward movement of the foot-lever, as I have devised other means which form the subject of a separate application, and I remark that the stops engaging each other prevent the case being revolved beyond the desired point, and when the motion is arrested the pressure of the foot can be regulated with facility in applying the brake.

When it is desired to limit the movement of the foot-lever in releasing the clamp-strap, the adjustable stop 24 upon the lever may be used to come into contact with the stop 25, fastened to the case above said stop 24.

I claim as my invention—

1. The combination with the cycle-wheel and its hub, of an axle secured to the hub and having a pinion on the axle, an axle-box fastened to the frame and surrounding the bearing of the axle, studs supported by the axle-box, intermediate pinions upon said studs engaging the axle-pinion, an internal gear-ring surrounding the pinions, a case surrounding the axle-box and gearing, and adapted to receive a turning motion, a lever pivoted upon the case and means for connecting the lever and the internal gear upon the downward movement of the lever and for allowing them to separate upon the upward movement of the lever, substantially as set forth.

2. The combination with the box, the axle and the pinion thereon and the ball-bearing between the axle and the box, of studs supported by the box, pinions on the studs, an internal gear-ring around the pinions, a case surrounding and inclosing the gearing and having a cover extending across the end of the axle, ball-bearings upon the inner side of the cover and receiving and supported by the end of the axle and means for giving motion to the case and the inclosed gearing, substantially as set forth.

3. The combination with an internal gear-ring, the wheel, axle, pinion and intermediate gears, of a lever and means for intermittently engaging therewith the internal gear-ring and a case upon which the lever is pivoted, such case being adapted to turn around the axle by the action of the lever, substantially as set forth.

4. The combination with the cycle-wheel and its hub and the frame, of an axle secured to the hub and having a pinion on the axle, an axle-box fastened to the frame and surrounding the bearing of the axle, studs supported by the axle-box, intermediate pinions upon said studs engaging the axle-pinion, an internal gear-ring surrounding the pinions and having guide-flanges at opposite sides of the pinions, a case surrounding the axle-box and gearing and adapted to receive a turning motion, a lever pivoted upon the case and means for connecting the lever and the internal gear upon the downward movement of the lever and for allowing them to separate upon the upward movement of the lever, substantially as set forth.

5. The combination with the front wheel and its hub and the frame-fork, of an axle secured to the hub and having a pinion on the axle, an axle-box fastened to the frame-fork and surrounding the bearing of the axle, studs supported by the axle-box, intermediate pinions upon said studs engaging the axle-pinion, an internal gear-ring surrounding the pinions, a case surrounding the axle-box and gearing and adapted to receive a turning motion, a lever having a forked end pivoted upon the case, a clamp-strap within the case and surrounding the internal gear and connected at its ends to the fork of the lever for turning the internal gear by the downward movement of the lever and for releasing the internal gear upon the upward movement of the lever, substantially as set forth.

6. The combination with the front wheel and its hub and the frame-fork, of an axle secured to the hub and having a pinion on the axle, an axle-box fastened to the frame-fork and surrounding the bearing of the axle, studs supported by the axle-box, intermediate pinions upon said studs engaging the axle-pinion, an internal gear-ring surrounding the pinions, a case surrounding the axle-box and gearing, and adapted to receive a turning motion, a lever having a forked end pivoted upon the case, a clamp-strap within the case and surrounding the internal gear and connected at its ends to the fork of the lever, and an adjusting-coupling for varying the length of the clamp-strap, substantially as set forth.

7. The combination with the front wheel and its hub and the frame-fork, of an axle secured to the hub and having a pinion on the axle, an axle-box fastened to the frame-fork and surrounding the bearing of the axle, studs supported by the axle-box, intermediate pinions upon said studs engaging the axle-pinion, an internal gear-ring surrounding the pinions, a case surrounding the axle-box and gearing and adapted to receive a turning motion, a lever having a forked end pivoted upon the case, a clamp-strap within the case and surrounding the internal gear and connected at its ends to the fork of the lever for turning the internal gear by the downward movement of the lever and for releasing the internal gear upon the upward movement of the lever, dust-guards upon the lever at its fork where the same passes through the opening in the case, and a forked guide upon the case for receiving the lever, substantially as set forth.

8. The combination with the front wheel and its hub and the frame-fork, of an axle secured to the hub and having a pinion thereon, an axle-box fastened to the frame-fork and surrounding the bearing of the axle, studs supported by the axle-box, intermediate pinions upon said studs engaging the axle-pinion, an internal gear-ring surrounding the pinions, a case surrounding the axle-box and gearing and adapted to receive a turning motion, a lever having a forked end pivoted upon the case, a clamp-strap within the case and surrounding the internal gear and connected at its ends to the fork of the lever for turning the internal gear by the downward movement of the lever and for releasing the internal gear upon the upward movement of the lever, a spring between the lever and the case for aiding in moving the case upon the return motion of the lever, substantially as set forth.

9. The combination in a cycle of a gear-ring, a driving-wheel and axle, gearing between the same and the gear-ring, a lever and a case upon which the lever is pivoted and stops to arrest the movement of the lever, and frictional mechanism for intermittently connecting the lever and gear-ring or for applying a friction to the gear-ring to act as a brake, substantially as set forth.

10. The combination in a cycle of a gear-ring a driving-wheel and axle and gearing between the same and the gear-ring, a lever and a case upon which the lever is pivoted, a strap for intermittently connecting the lever and gear-ring, and stops to arrest the movement of the lever and cause such lever and strap to act as a brake, and a spring acting to move the lever and the parts therewith connected in the opposite direction to that given by the person to release the brake and to return the parts to a normal position, substantially as set forth.

Signed by me this 22d day of December, 1897.

ANSON P. STEPHENS.

Witnesses:
GEO. T. PINCKNEY,
S. T. HAVILAND.